US 8,200,222 B2

(12) United States Patent
Kim (10) Patent No.: US 8,200,222 B2
(45) Date of Patent: Jun. 12, 2012

(54) METHOD OF TRANSMITTING DATA FOR HANDOVER IN BROADBAND WIRELESS ACCESS SYSTEM

(75) Inventor: Yong Ho Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 753 days.

(21) Appl. No.: 11/718,093

(22) PCT Filed: Nov. 4, 2005

(86) PCT No.: PCT/KR2005/003719
§ 371 (c)(1),
(2), (4) Date: Aug. 31, 2009

(87) PCT Pub. No.: WO2006/049456
PCT Pub. Date: May 11, 2006

(65) Prior Publication Data
US 2009/0312021 A1    Dec. 17, 2009

(30) Foreign Application Priority Data
Nov. 4, 2004    (KR) ........................ 10-2004-0089416

(51) Int. Cl.
H04W 36/00    (2009.01)
H04W 36/36    (2009.01)
(52) U.S. Cl. ........................ 455/436; 455/437; 370/331
(58) Field of Classification Search .......... 455/436–444; 370/331–334
See application file for complete search history.

(56) References Cited

U.S. PATENT DOCUMENTS

| 6,778,830 | B1 * | 8/2004 | Oizumi et al. ................ 455/436 |
| 2003/0157927 | A1 * | 8/2003 | Yi et al. ........................ 455/411 |
| 2004/0017798 | A1 * | 1/2004 | Hurtta et al. .................. 370/352 |
| 2005/0266848 | A1 * | 12/2005 | Kim ............................ 455/436 |

FOREIGN PATENT DOCUMENTS

| EP | 1 018 849 A3 | 7/2000 |
| KR | 10-2002-0087907 | 11/2002 |
| WO | WO 98/47302 | 10/1998 |

OTHER PUBLICATIONS

3GPP TS 44.060 v6.9.0 (Sep. 2004).*
Kim, Y.H. "Handover—Serving BS Release with Data Forwarding", IEEE 802.16 Broadband Wireless Access Working Group, IEEE C802.16e-04/76r1, [online], May 17, 2004 [retrieved on Mar. 9, 2007]. Retrieved from the Internet: <URL:http://www.ieee802.org/16/tge/contrib/C80216e-04_76r1.pdf>. pp. 1-8.

(Continued)

Primary Examiner — Matthew Sams
(74) Attorney, Agent, or Firm — Lee, Hong, Degerman, Kang & Waimey (57) ABSTRACT

A data transmission method in a mobile communication system is disclosed. The present invention is suitable for retaining continuity of a data service in case that a mobile subscriber station carries out handover. The present invention includes the steps of receiving a message information (S41) indicating a handover completion of a mobile subscriber station from the second base station, releasing a radio resource of the first base station for the mobile subscriber station according to the message, and after releasing the radio resource, transmitting data (S42) to be transmitted to the mobile subscriber station to the first base station to the second base station.

5 Claims, 3 Drawing Sheets

OTHER PUBLICATIONS

Kang, H. et al., "Resource Retaining Time and Call Recovery Scheme during HO—HO Ad-Hoc Consensus Contribution", IEEE 802.16 Broadband Wireless Access Working Group, IEEE C802.16e-04/154r1, [online], Jul. 7, 2004 [retrieved on Mar. 9, 2007]. Retrieved from the Internet: <URL:http://www.ieee802.org/16/tge/contrib/C80216e-04_154r1.pdf>. section 11.

Kim, "Handover—Serving BS Release with Data Forwarding", IEEE 802.16 Broadband Wireless Access Working Group, IEEE C802.16e-04/76r1, May 2004.

Kim, "Handover—Data Forwarding and deferring IP re-establishment", IEEE 802.16 Broadband Wireless Access Working Group, IEEE C802.16e-04176r2, Jun. 2004.

* cited by examiner

METHOD OF TRANSMITTING DATA FOR HANDOVER IN BROADBAND WIRELESS ACCESS SYSTEM

CROSS-REFERENCE TO RELATED APPLICATIONS

This application is the National Stage filing under 35 U.S.C. §371 of International Application No. PCT/KR2005/03719, filed on Nov. 4, 2005, which claims the benefit of earlier filing date and right of priority to Korean Application No. 10-2004-0089416, filed on Nov. 4, 2004.

TECHNICAL FIELD

The present invention relates to a communication system, and more particularly, to a data transmission method suitable for retaining continuity of a data service in case that a mobile subscriber station carries out handover.

BACKGROUND ART

Generally, a mobile subscriber station (MSS) carries out cell reselection using neighbor base station (BS) information obtained from a neighbor base station advertisement message (NBR-ADV). In doing so, scanning or ranging can be carried out for a scan or slip interval. Handover is initiated in a manner that a mobile subscriber station decides to switch to a handover target base station from a previous serving base station at a wireless interface, service flow and network access point. And, whether to perform handover is decided by a mobile subscriber station, a serving base station or a network manager.

A base station needs to perform scanning on a handover target base station to acquire uplink/downlink channel and synchronization. If a mobile subscriber station previously receives a neighbor base station advertisement message (NBR-ADV) including a target base station identifier, a physical frequency and DCD/UCD, scanning and synchronization processes can be simplified. If the handover target base station receives a handover notification from a serving base station via a backbone, the handover target base station can provide a non-competitive type initial ranging opportunity (Fast_UL_ranging IE) via an uplink map (UM-MAP).

The mobile subscriber station and the handover target base station initiate a network reentry procedure by performing ranging. If the mobile subscriber station transmits a ranging request message (RNG-REQ) including a valid serving base station identifier and if the handover target base station does not receive the information of the mobile subscriber station via the backbone previously, the handover target base station requests mobile subscriber station information to the serving base station via the backbone. The serving base station can send a corresponding response.

The handover target base station can request mobile subscriber station information to an authentication station. A network reentry proceeds in the same manner of an initial entry and its procedure can be simplified using the mobile subscriber station information received via a backbone network. A network reentry procedure is completed if the mobile subscriber station reaches a normal operation state.

A handover procedure is terminated by a mobile subscriber station service end with a previous serving base station. The service end means that the servicing base station releases all connections with the mobile subscriber station and all kinds of information associated with the connections (information stored in cue, ARQ status information, counter, timer, header compression information, etc. are deleted)). Meanwhile, the mobile subscriber station can cancel the handover in progress at any time.

Messages used in a handover process are explained as follows. A base station handover request message (MOB-BSHO-REQ) is a message transmitted in case that a base station attempts to initiate handover. A mobile subscriber station having received the base station handover request message (MPB-BSHO-REQ) can carryout scanning on a recommended neighbor base station. The message is transmitted via a basic connection identifier (basic CID).

Once the base station receives a handover request message (MSS-HO-REQ), the base station should transmit a handover response message (MOB-BSHO-RSP) to the mobile subscriber station. The message should be transmitted via the basic connection identifier. The mobile subscriber station transmits a handover indication message (HO-IND) as a final indication that handover will be executed soon to the base station. In case of canceling or rejecting handover, the mobile subscriber station transmits a handover indication message (HO-IND) having a set value of HO_IND_type. The message is transmitted via the basic connection identifier.

Table 1 is an example of a handover request message (MOB-BSHO-REQ) transmitted from a base station.

TABLE 1

| Syntax | Size | Notes |
| --- | --- | --- |
| MOB-BSHO-REQ_Message_Format( ){ | | |
| Management Message Type = 56 | 8 bits | |
| Network Assisted HO Supported | 1 bit | Indicate that the BS supports Network Assisted HO |
| Mode | 3 bits | 0b000: HHO Request 0b001~0b111: Reserved |
| If)Mode==0b00){ | | |
| N_Recommended | 8 bits | N_Recommended can be derived from the known length of the message |
| For(j=0;j<N_Recommended;j++){ | | |
| NeighborBSID | 48 bits | |
| Preamble Index | 8 bits | |
| Service level prediction | 8 bits | |
| HO process Optimization | 8 bits | |
| } | | |
| } | | |
| Action time | 8 bits | |
| Resource Retain Type | 1 bit | 0: MSS resource release |
| Reserved | 6 bits | 1: MSS resource release |
| TLV encoded information{ | variable | TLV specific |
| HMAC Tuple | | |
| } | | |
| } | | |

Table 2 is an example of a handover response message (MOB-BSHO-RSP) transmitted from a base station.

TABLE 2

| Syntax | Size | Notes |
| --- | --- | --- |
| MOB-BSHO-RSP_Message_Format( ){ | | |
| Management Message Type = 58 | 8 bits | |
| Mode | 3 bits | 0b00: HHO Request 0b011~0b111: Reserved |

TABLE 2-continued

| Syntax | Size | Notes |
|---|---|---|
| If)Mode==0b00){ | | |
| N_Recommended | 8 bits | |
| For(j=0;j<N_Recommended;j++){ | | Following neighbor BS is aligned in order of recommendation |
| Neighbor BS ID | 48 bits | |
| Preamble Index | 8 bits | |
| HO process Optimization | 8 bits | |
| HO_ID_included_indicator==1){ | | Indicates if the field HO_ID is included |
| HO_ID | 8 bits | |
| } | | |
| } | | |
| Action time | 8 bits | |
| Resource Retain Type | 1 bit | 0: MSS resource release |
| | | 1: MSS resource retain |
| While(!(byte_boundary)){ | | |
| Padding bits | | |
| } | | |
| TLV encoded information{ | variable | TLV specific |
| TLV encoded information{ | variable | TLV specific |
| HMAC Tuple | | |
| } | | |
| } | | |

Table 3 is an example of a handover indication message (HO-IND).

TABLE 3

| Syntax | Size | Notes |
|---|---|---|
| HO-IND_Message_Format( ){ | | |
| Management Message Type = 59 | 8 bits | |
| Reserved | 6 bits | |
| Mode | 3 bits | 0b00: HHO Request |
| If)Mode==0b00){ | | |
| Target_BS_ID | 48 bits | Applicable only when HO_IND_type is set to 00 |
| Preamble Index | 8 bits | |
| While(!(Byte_boundary)){ | | |
| Padding bits | | |
| } | | |
| TLV encoded information{ | variable | TLV specific |
| HMAC Tuple | | |
| } | | |
| } | | |

Parameters included in the message to be associated with the present invention are explained as follows. A resource retain type flag indicates whether a serving base station deletes or retains connection information of a mobile subscriber station in case of receiving an HO-IND message having a set serving base station (BS) release option. If the flag is set to 1, the serving base station retains the connection information of the mobile subscriber station during a resource retain time. If the flag is set to 1 and if the resource retain time is not included in TLV, the serving base station and the mobile subscriber station retain the connection information of the mobile subscriber station during the resource retain time. If the flag is set to 0, the serving base station should delete the connection information of the mobile subscriber station.

MOB-BSHO-REQ may include the following TLV. The resource retain time is time during which the serving base station retains the connection information of the mobile subscriber station. A timer is set by 100 msec unit. Of the parameter is set to 0, the serving base station retains the connection information of the mobile subscriber station during the resource time retain time set by an initial registration stage. If the parameter is set to another value except 0, the serving base station sets a new resource retain time. And, the serving base station activates a resource retain interval timer according to the newly set value right after having received the HO-IND message indicating to execute handover from the mobile subscriber station.

Table 4 is an example of a resource retain time TLV.

TABLE 4

| Type (1 byte) | Length | Value | Scope |
|---|---|---|---|
| 1 | 1 | 0: The serving BS will retain the MSS's connection information during Resource Retain Time negotiated at registration stage. 1-255: Resource Retain Time (100 msec unit) | MOB-BSHO-REQ MOB-BSHO-RSP |

Figure 1:
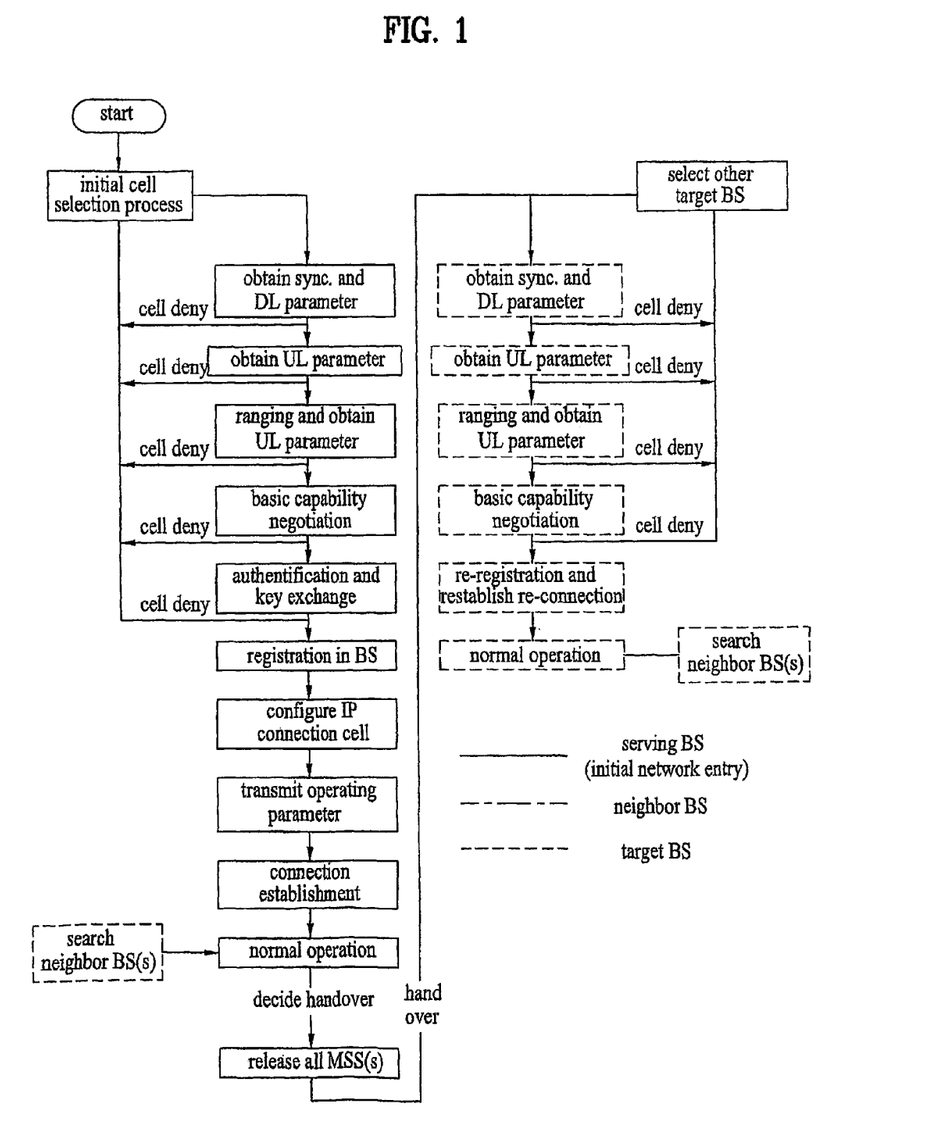
FIG. 1 is an exemplary flowchart of a handover and initial network entry procedure.
Figure 2:
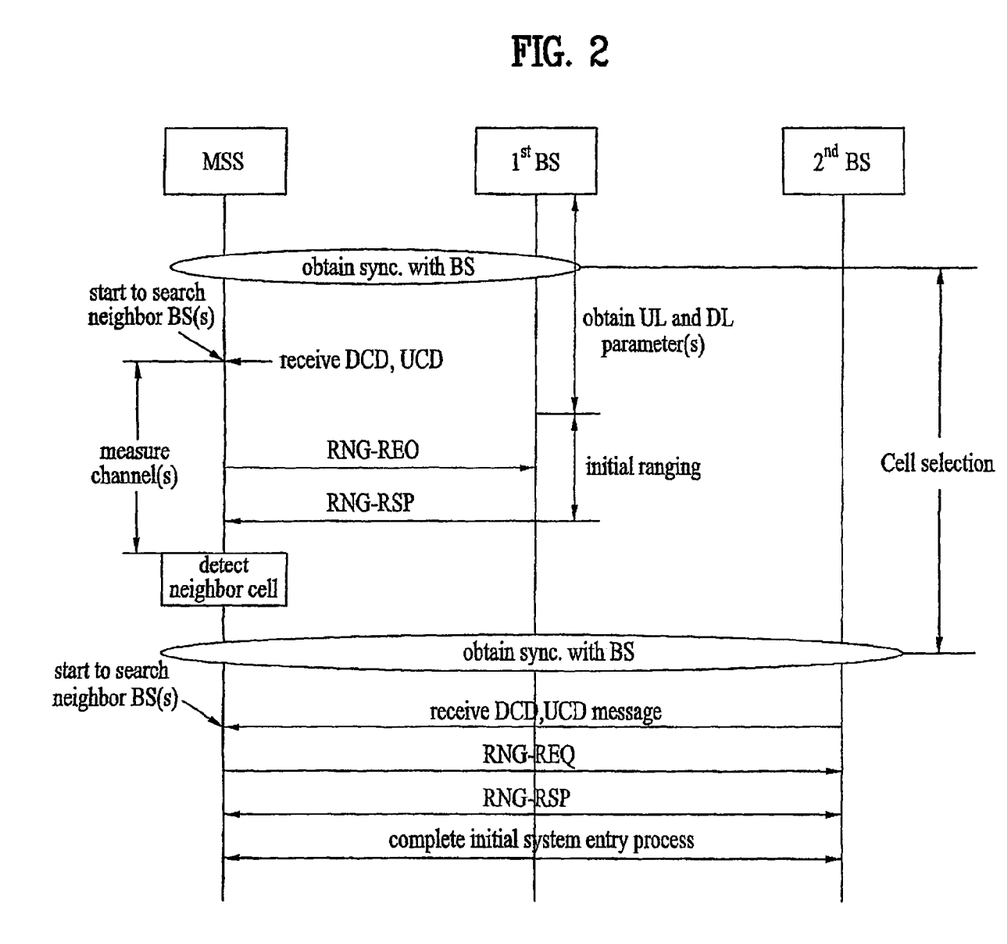
FIG. 2 is an exemplary flowchart of a cell selection procedure.

FIG. 1 is an exemplary flowchart of a handover and initial network entry procedure. And, FIG. 2 is an exemplary flowchart of a cell selection procedure. Cell selection is a procedure that a mobile subscriber station performs scanning or ranging with at least one base station to search for a base station suitable for network connection or handover. In the cell selection procedure, the mobile subscriber station can utilize a neighbor base station advertisement message (NBR-ADV) to obtain appropriate neighbor base station information. To decide handover possibility to a potential handover target base station, the mobile subscriber station should perform scheduling on a scan interval or a slip interval. Such a procedure is not associated with a release of a previous connection to a serving base station and reestablishment of the connections at a target base station. In case of performing ranging with the potential handover target base station, a newly allocated basic connection identifier (basic CID) and first connection identifier (primary CID) are limited to a corresponding handover target base station only and do not replace a previous basic CID and primary CID used in communications with the serving base station.

As the mobile subscriber station decides to make handover to a prescribed handover target base station from a serving base station, handover is initiated. The handover decision can be made by the mobile subscriber station, serving base station or network. By notifying a handover intention to another party in a manner of transmitting a handover request message, the handover is initiated. In doing so, a process of notifying the handover intention is not mandatory but recommendatory. The process of notifying the handover intention can be initiated by the mobile subscriber station or the serving base station.

In transmitting a handover request message (MSS-HO-REQ), a mobile subscriber station can designate at least one or more available handover target base stations. The mobile subscriber station can evaluate the available handover target base stations through the previously performed searching, ranging and adjustment. A base station can designate a handover target base station in transmitting a MOB-BSHO-REQ message. The MSS-HO-REQ message can include an expected time taken for performing the handover.

Meanwhile, in transmitting the MOB-BSHO-REQ message, a base station can recommend at least one or more handover target base stations. The recommended handover target base stations can be selected by considering values such as a QoS performance prediction of a corresponding handover target base station for the request of the mobile subscriber station. The serving base station can obtain theses values through communications with neighbor base stations via a backbone network. The transmissions between the serving base station and the neighbor base station via the backbone network for the exchange of the information associated with the action of the mobile subscriber station need not to be necessarily performed for a specific handover but can be previously performed prior to the handover request message.

It is not mandatory but recommendatory for the mobile subscriber station to substantially perform handover to a handover target base station designated by a handover response message. Namely, the mobile subscriber station can attempt handover to any handover target base station regardless of the handover response message. In doing so, the mobile subscriber station should performing an initial ranging process to a handover target base station by considering that the corresponding handover target base station may not receive any notification about the handover over from the serving base station.

In case that the mobile subscriber station transmits an HO-IND message having an HO_IND type set to 10 (HO rejection option) to reject a handover request of the serving base station, the serving base station reestablishes a handover target base station list and can retransmit a handover response message (MOB-BSHO-RSP) including the list.

The serving base station can inform at least one or more handover target base stations that the mobile subscriber station is going to make handover via a backbone network. To perform the handover quickly, the serving base station can send information of the mobile subscriber station via the backbone network. The mobile subscriber station initiates the handover as son as transmits an MSS_HO-REQ message to a base station. The transmitted MSS_HO-REQ message includes information of a base station available as a handover target base station or a cell. The base station having received the MSS_HO-REQ message informs a neighbor base station of the handover request via the backbone network. And, the base station obtains information, which indicates whether a service for the mobile subscriber station requesting the handover can be supported, from the neighbor base station.

The base station transmits a response for the handover request to the mobile subscriber station via a MOB-BSHO-RSP message. The MOB-BSHO-RSP message includes information about a base station suitable as a handover target base station. And, the MOB-BSHO-RSP message may include an estimated time taken to reach an occurrence of handover as well.

After the mobile subscriber station has decided to perform the handover, if the mobile subscriber station transmits an HO-IND message indicating a serving base station release, it is unnecessary to monitor a downlink traffic of the serving base station unless the mobile subscriber station cancels the handover or is connected to the serving base station.

Before transmitting the HO-IND message from the initiation of the handover, the mobile subscriber station can cancel the handover at any time. The mobile subscriber station can transmits the handover by transmitting an HO-IND message having a set handover cancellation option (HO_IND type=01) to the base station.

During a resource retain time (if Resource Retain Type=1), if the mobile subscriber station sends the HO-IND message having the handover cancellation option and if the serving base station receives the message, the mobile subscriber station and the serving base station should reinitiate communications in normal operation mode regardless of the handover attempt of the mobile subscriber station.

After completion of transmission/reception of the handover request message and the handover response message, the mobile subscriber station initiates real handover. This is performed by transmitting an HO_IND MAC message having a serving base station release option to the base station. If an HO-IND_type field indicates the serving base station release, the base station can entirely release or retain all connections, medium access message (hereinafter abbreviated MAC) state transition, and MAC protocol data unit (PDU).

If the HO-IND_type field is set to the serving base station release, the base station should drive a resource retain timer. If a resource retain type value is set to 0, the serving base station immediately releases all connections to the mobile subscriber station and should delete a medium access control state transition degree, MAC PDU and the like immediately. If the resource retain type value is set to 1, the serving base station retains the connection to the mobile subscriber station, the medium access control state transition degree, MAC PDU and the like to secure service continuity until the resource retain timer expires. Regardless of the resource retain timer, if receiving a backbone message indicating that the mobile subscriber station has successfully accessed the handover target base station, the serving base station releases all connections to the mobile subscriber station and should delete the medium access control state transition degree, all PDUs associated with the corresponding mobile subscriber station such as MAC PDU and the like.

If the serving base station sets the HO-IND_type field value to '00' and if the serving base station decides to retain the connection information of the mobile subscriber station having initiated the handover, the connection information can be used for the mobile subscriber station to perform a quick network reentry action with the handover target base station or the serving base station. The serving base station should inform a connection information retain of the mobile subscriber station via a resource retain type of MOB-BSHO-REQ or MOB-BSHO-RSP in handover request/response transmission/reception. If the resource retain type is set to 1 and if the resource retain time is not included as TLV, the serving base station and the mobile subscriber station should use a system resource retain time timer. And, the system resource retain time timer is determined in a registration process.

A drop defines a situation that a communication (either uplink or downlink) between the mobile subscriber station and the serving station is stopped before the mobile subscriber station ends the normal handover procedure summarized in the cell selection and termination. The mobile subscriber station regards a failure of downlink demodulation as the drop or can detects the drop if the number of RNG-REQ retransmissions allowed by a cyclic ranging mechanism is exceeded. The base station can detect the drop if the number of reattempts allowed by the cyclic ranging mechanism is exceeded.

If the mobile subscriber station detects the drop in a network reentry process with the handover target base station, the mobile subscriber station can reinitiate the communications with the serving base station by setting the HO-IND_type of the HO-IND to 01 (HO cancel) to transmit to the serving base station. In case of failing in the communication re-initiation with the serving base station, the mobile subscriber station should attempt a network re-access to a preferred handover target base station. In case that the serving base station detects the drop, the same procedure of receiving the HO-IND message having the HO-IND_type set to the serving base station release should be carried out.

Except that a non-competitive type initial ranging transmission opportunity may be acquired to perform a management message transmission/reception procedure for network entry/reentry, the mobile subscriber station and the handover target base station should carry out a predetermined ranging procedure. In the non-competitive type initial ranging performed in the network reentry procedure, a MAC address of the mobile subscriber station is included in the RNG-REQ message instead of the basic CID. The handover target base station should transmit the basic CID and primary CID of the mobile subscriber station over the RNG-RSP message. The non-competitive type initial ranging procedure such as an invited ranging procedure needs one RNG-REQ/RNG-RSP message exchange. Yet, if a non-competitive type initial ranging allocation or a general bandwidth allocation procedure continues, an additional RNG-REQ/RNG-RSP message exchange may be needed. Unlike the initial ranging, the handover target base station can delay fine correction of physical link quality parameter setting through the RNG-REQ/RNG-RSP message exchange to perform a quick handover procedure.

By including a serving base station identifier TLV and a handover indicator TLV in the RNG-REQ message, the mobile subscriber station can inform the handover target base station that the mobile subscriber station is currently performing the handover. If the mobile subscriber station is not substantially performing the handover, the handover indicator TLV should not be included. In case that the mobile subscriber station transmits the RNG-REQ message including the serving base station identifier TLV and the handover indicator TLV, if the handover target base station fails in previously receiving the information of the corresponding base station via the backbone, the handover target base station can request information of the mobile subscriber station to the serving base station via the backbone. And, the serving base station can make a response to the request. Regardless of whether the mobile subscriber station information is received from the serving base station, the handover target base station can request mobile subscriber station information to another network management entity via the backbone message.

In case of acquiring the information about the mobile subscriber station attempting to make handover via the backbone, the handover target base station should include a handover process optimization TLV in a ranging response (RNG-RSP) message to inform network reentry management messages skippable according to availability of the corresponding information. In case that the omission of the reentry procedure management message jeopardizes security of non-defectiveness for a normal communication action established through an initial entry procedure, the handover target base station should not skip the corresponding reentry procedure management message.

Regardless of a handover (HO) process optimization TLV setting value, the handover target base station can use a service and operation information of the mobile station acquired via the backbone, can transmit an SBC-RSP or REG-RSP management message to update mobile subscriber station operation information, or can transmit information to be included in the SBC-RSP or REG-RSP management message in a TLV format of the RNG-RSP message. An REQ message corresponding to a management message, which is firstly received when the handover target base station unilaterally receives the SBC-RSP or REG-RSP message, can be ignored.

In case that a mobile subscriber station receives a unilateral SBC-RSP or REG-RSP message from a base station, the mobile subscriber station needs not to transmit an REQ message corresponding to the management message. Reentry response management messages unilaterally transmitted from a handover target base station can be transmitted together over the same downlink frame or over a downlink frame that carries the RNG-RSP. Yet, in case that a {KM-REQ/RSP management message procedure is necessary, the unilateral SBC-RSP message and the unilateral REG-RSP message may not be transmitted together over the same downlink frame. The non-defectiveness of the initial ranging procedure disclosed in section 6.2.12.5 should be guaranteed. In case that it is not decided to skip a security key procedure in HO process optimization TLV setting, if a mobile subscriber station transmits an RNG-REQ message including a serving base station identifier and a handover indicator TLV and if a handover target base station acquires information of the corresponding mobile subscriber station via backbone, the mobile subscriber station and the handover target base station should perform a PKM-REQ information and re-authentication procedure.

If the RNG-REQ message includes the serving base station identifier and the handover indicator and if the handover target base station acquires the mobile subscriber station information via the backbone, the handover target base station can configure service flow re-mapping information to be included in the REG-RSP message using the mobile subscriber station service station and operation information acquired via the backbone. The re-mapping information is stored in New_CID, Old_CID and Connection_Info TLV of the REG-RSP message.

The handover target base station can inform that there is data the mobile subscriber station will receive in downlink via an MSS DL data pending corresponding to a $7^{th}$ bit of the HO Process Optimization TLV. If the mobile subscriber station successfully performs a network reentry procedure with a handover target base station and if the mobile subscriber station completes a downlink data reception having been delayer due to handover from the new serving base station, the mobile subscriber station performs an IP reconnection procedure. The new serving base station then informs a previous serving base station or backbone that downlink data of the mobile subscriber station needs not to be further forwarded.

The network entry/reentry procedure is terminated if the mobile subscriber station is in a normal operation mode. If the handover target base station recognizes a handover network entry/reentry failure, the handover target base station can transmit a backbone message indicating a handover failure to the serving base station.

In the related art, the serving base station decides the resource retain of the mobile subscriber station in handover and informs the mobile subscriber station of the resource retain decision via a base station handover request/response message. And, the serving base station selectively informs the resource retain time. If the resource retain time is not informed, an initially determined value is used. Thus, once the resource retain of the mobile subscriber station is decided, if the mobile subscriber station is receiving downlink data, its delivery is carried out from the serving base station to the handover target base station in handover. The handover target base station then informs that there is standby downlink data while the network reentry process of the mobile subscriber station is in progress.

However, if the mobile subscriber station successfully performs the handover to reenter the network of the handover target base station, the corresponding state is known to the previous serving base station via the backbone network. The previous serving base station having received the corresponding state discards the retain information of the mobile subscriber station having successfully performed the handover and the retained MAC PDU entirely. Thus, in case that the mobile subscriber station which is receiving data carries out handover, the continuity of the service cannot be guaranteed.

DISCLOSURE

Technical Problem

Technical Solution

Advantageous Effects

To achieve these and other advantages and in accordance with the purpose of the present invention, in a broadband wireless access system, a data transmission method, which is applied in handover, of a base station according to the present invention includes the steps of transmitting data to a mobile subscriber station according to a request of the mobile subscriber station, receiving a message for a handover request from the mobile subscriber station, transmitting information indicating whether to retain a resource to transmit the data to the mobile subscriber station, transmitting the data to the base station decided as a handover target base station, receiving a message indicating a handover success, releasing a radio resource associated with the handover, and according to the information indicating whether to retain the radio resource, transmitting the data to the handover target base station or terminating a data transmission.

In another aspect of the present invention, in a broadband wireless access system, a data transmission method, which is applied in handover, of a base station includes the steps of transmitting data to a mobile subscriber station according to a request of the mobile subscriber station, transmitting a handover request message including information indicating whether to retain a resource to transmit the data to the mobile subscriber station to the mobile subscriber station, transmitting the data to the base station decided as a handover target base station, receiving a message indicating a handover success, releasing a radio resource associated with the handover, and according to the information indicating whether to retain the radio resource, transmitting the data to the handover target base station or terminating a data transmission.

In another aspect of the present invention, in a broadband wireless access system, a data transmission method, which is applied in handover, of a base station includes the steps of transmitting data to a mobile subscriber station according to a request of the mobile subscriber station, transmitting a handover response message including information indicating whether to retain a resource to transmit the data to the mobile subscriber station to the mobile subscriber station, transmitting the data to the base station decided as a handover target base station, receiving a message indicating a handover success, releasing a radio resource associated with the handover, and according to the information indicating whether to retain the radio resource, transmitting the data to the handover target base station or terminating a data transmission.

BEST MODE

More for Invention

The aforesaid objectives, features and advantages of the invention will be set forth in the description which follows, and in part will be apparent from the description. Reference will now be made in detail to one preferred embodiment of the present invention, examples of which are illustrated in the accompanying drawings. Details of a handover procedure and data transmission via a backbone network are disclosed in document IEEE 802.16e.

The present invention intends to provide a procedure and method of controlling a handover target base station data delivery with a serving base station for service continuity when a mobile subscriber station, which is receiving data, performs handover.

To guarantee service continuity when a mobile subscriber station, which is receiving data, performs handover, the present invention defines a method and procedure for managing information/resource retain of the mobile subscriber station and data to be delivered in order for serving and target base stations to deliver the data of the mobile subscriber station in handover.

In case that a mobile subscriber station in receiving data initiates handover, a serving base station informs the mobile subscriber station whether to deliver the data in reception for service continuity. If the mobile subscriber station initiates handover, the serving base station delivers the retained data to a handover target base station. The handover target base station then delivers it to the mobile subscriber station. If the serving base station is notified from the handover target base station that the mobile subscriber station has successfully performed the handover and completes a network access, the serving base station releases information and resources for the mobile subscriber station to use for communication re-initiation with the serving base station in failure. Yet, the serving base station keeps transmitting the data that is being transmitted. The data transmission continues until the serving base station receives a data transmission stop (Stop-Data-Forwarding) message requesting to stop the transmitted message from the handover target base station. The data transmission stop message can be transmitted via a backbone network.

In the present invention, a message including a conventional message having a parameter added thereto to achieve the objectives of the present invention is explained as follows. First of all, a parameter, which indicates that there is data to be transmitted, is added to a base station handover request message (MOB-BSHO-REQ). Meanwhile, a parameter, which indicates there is data to be transmitted, is added to a base station handover response message (MOB-BSHO-RSP).

Table 5 is an example of a base station handover request message (MOB-BSHO-REQ) according to the present invention.

TABLE 5

| Syntax | Size | Notes |
|---|---|---|
| MOB-BSHO-REQ_Message_Format( ){ | | |
| Management Message Type = 56 } | 8 bits | |
| Action time | 8 bits | |
| Resource Retain Type | 2 bits | 0b00: MSS resourced release<br>0b01: MSS resourced retain without data forwarding<br>0b02: MSS resourced retain with data forwarding |
| Reserved<br>Padding bits | 5 bits | |
| TLV encoded information{<br>HMAC Tuple<br>}<br>} | variable | TLV specific |

Table 6 is an example of a base station handover response message (MOB-BSHO-RSP) according to the present invention.

TABLE 6

| Syntax | Size | Notes |
|---|---|---|
| MOB-BSHO-RSP_Message___Format( ){ | | |
| Management Message Type = 58 } | 8 bits | |
| Action time | 8 bits | |
| Resource Retain Type | 2 bits | 0b00: MSS resourced release<br>0b01: MSS resourced retain without data forwarding<br>0b02: MSS resourced retain with data forwarding |
| While (!(byte_boundary)) { | | |
| Padding bits } | | |
| TLV encoded information{ | variable | TLV specific |
| TLV encoded information{ | variable | TLV specific |
| HMAC Tuple } | | |
| } | | |

Yet, parameters used in the above tables are usable as parameters of each message for example and can be changed.

An added resource retain type in the message is explained as follows. The MSS resource release is not to retain resource/information of a mobile subscriber station. The MSS resource release is to immediately release resource/information of the mobile subscriber station if the mobile subscriber station transmits a handover indicator (HO-IND) meaning a handover initiation.

The MSS resource retain without data forwarding is to retain source/information of a mobile subscriber station during a resource retain time or to release the resource/information in case of receiving information that the mobile subscriber station having successfully performed handover completes a network access to a handover target base station from a network. In case that the type is set to be transmitted, there exist a case that data is being received and a case that data is not received. Even if a mobile subscriber station is receiving data, packet data in reception is not transmitted to a handover target base station.

In case of transmitting data, the MSS resource retain with data forwarding can be set to the case of performing handover when a mobile subscriber station is receiving data to be forwarded. If this type is set and forwarded, a serving base station forwards packet data, which is being received, to a handover target base station for continuity of a service of the mobile subscriber station. The packet forwarding is stopped if all packets in a buffer of the serving base station are forwarded, i.e., if all packets to be forwarded are forwarded or if a target base station receives a message requesting to stop data forwarding (Stop-Data-Forwarding) via a backbone.

Operational explanations of the present invention deal with an action of a serving base station, which forwards data to a target base station by being associates with resource/information retain of a mobile subscriber station for service continuity of the corresponding mobile subscriber station in case that the mobile subscriber station being receiving data from a base station performs handover, and another actions that should be performed for the former action. And, a condition and operation dealing with when the forwarding procedure is ended are explained as well.

Figure 3:
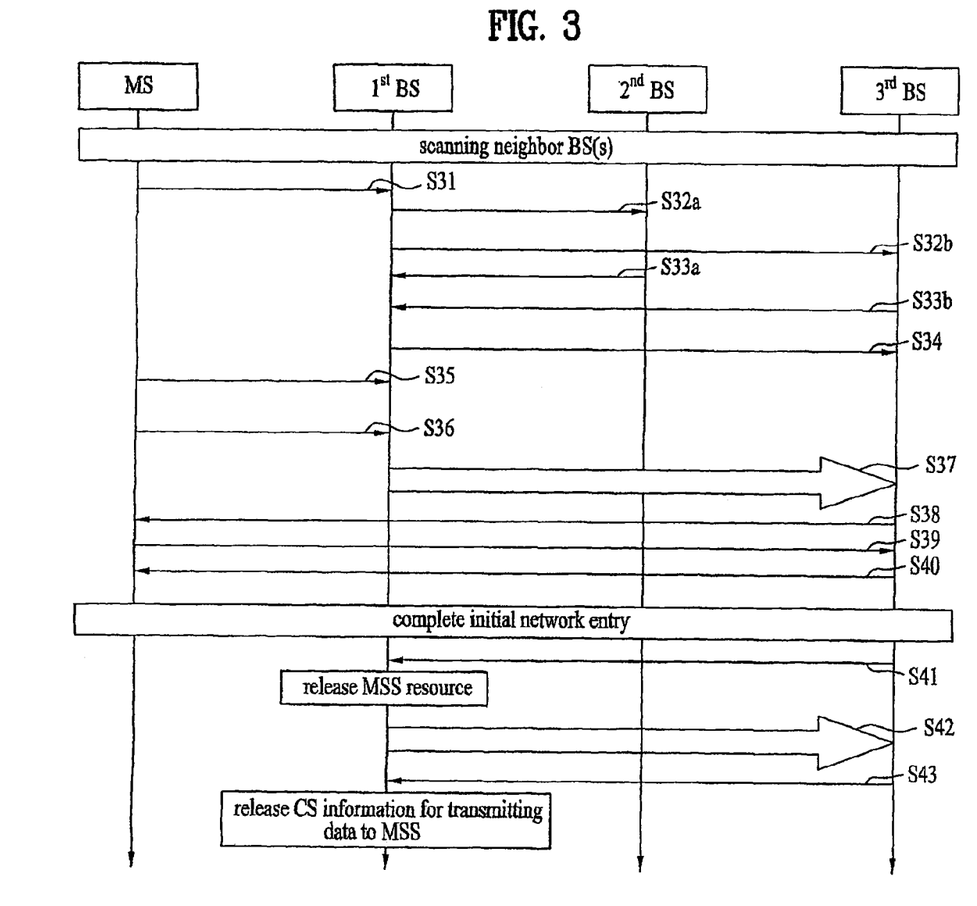
FIG. 3 is a flowchart of a data transmission method in handover according to one embodiment of the present invention.

FIG. 3 is a flowchart of a data transmission method in handover according to one embodiment of the present invention. FIG. 3 exemplarily shows a procedure that a serving base station forwards data to a handover target base station to enable a mobile subscriber station to receive data, which was being received, for service continuity after handover completion in case that the mobile subscriber station, which is receiving downlink data, performs the handover. In the present embodiment, the mobile subscriber station initiates the handover, which is similar to a case that a base station initiates handover.

A mobile subscriber station performs scanning on neighbor base stations. If deciding that handover is needed, the mobile subscriber station transmits a handover request message (MOB-MSSHO-REQ) to a serving base station (first base station, serving BS) (S31). The serving base station having received the handover request message from the mobile subscriber station transmits a handover pre-notification message (HO-pre-notification) to the neighbor base stations (S32a, S32b). The neighbor base stations, as shown in FIG. 3, include second and third base stations. The serving base stations receive response messages (HO-pre-notification-response) from the neighbor base stations in response to the handover pre-notification message (S33a, S33b).

The serving base station selects an optimal base station for handover from the base stations having transmitted the response messages in response to the handover pre-notification message and then transmits a handover confirm message to the selected base station (S34). Meanwhile, the serving base station transmits a handover response message (MOB-BSHO-RSP) to the mobile subscriber station (S35). The handover response message includes an identifier of a recommended base station to which the mobile subscriber station will hand over. Moreover, the handover response message includes information about a resource retain method. The information about the resource retain method may be transmitted via a handover request message (MOB-BSHO-REQ) starting from a base station. In the present embodiment, the present invention is explained through a method of performing handover by a mobile subscriber station which is receiving packet data in downlink.

The mobile subscriber station decides to perform handover using the third base station as a handover target base station (Target BS) and then sets a handover type to a service release (Serving BS release). The mobile subscriber station transmits the handover type to the serving base station using a handover indication message (MOB-HO-IND) (S36). The serving base station having received the handover indication message transmits data, which is being transmitted to the mobile subscriber station, to the handover target base station (S37). The mobile subscriber station performs a ranging process to access the handover target base station (S38~S40).

If an initial network access process is performed after successful completion of the handover, the handover target base station transmits a message indicating that the handover process was successfully performed to the serving base station (S41). The previous serving base station then releases radio resources or information retained for the mobile subscriber station. The purpose of the retained resource or information is to reinitiate a connection in case of a handover failure of the mobile subscriber station. Meanwhile, the retained resource or information is to deliver information of the mobile subscriber station to a new handover target base station having requested the information of the mobile subscriber station in case that the mobile subscriber station fails in the handover to a currently progressing handover target base station and attempts to hand over to another handover target base station except the previous serving base station. In doing so, the serving base station doe not release but retains informations of a convergence sublayer (hereinafter abbreviated CS) for forwarding of the remaining packet data.

Meanwhile, although the radio resource for the mobile subscriber station is released, data is forwarded to the handover target base station (new serving base station) (S42). If the new serving base station transmits a message indicating that the data forwarding can be stopped (S43), the convergence sublayer information to transmit data to the mobile subscriber station is released. Meanwhile, even if there is no more packet data to forward to the serving base station, the message indicating that the data forwarding can be stopped is transmitted.

Accordingly, the present invention keeps forwarding data to the handover target base station in performing handover until receiving the request of the message forwarding termination from the handover target base station despite the successful handover, thereby sustaining the continuity of the data service.

INDUSTRIAL APPLICABILITY

Accordingly, the present invention is applicable to a mobile communication system, and more particularly, to a broadband wireless access system.

The invention claimed is:

1. A method of transmitting data by a serving base station when a mobile subscriber station, which is receiving data, performs a handover from the serving base station to a target base station the method comprising:

transmitting data to the mobile subscriber station using a radio resource;

receiving a first message indicating a handover completion of the mobile subscriber station from the target base station;

releasing the radio resource for the mobile subscriber station based on the received first message;

transmitting the data which is being transmitted to the mobile subscriber station, to the target base station;

receiving a stop data forwarding message requesting to stop a data transmission via a backbone, from the target base station; and releasing convergence sublayer (CS) information of the serving base station for the mobile subscriber station based on the received stop data forwarding message.

2. The method of claim 1, further comprising:

transmitting a second message including information indicating resource retain type, to the mobile subscriber station, wherein the resource retain type includes a first type indicating to forward the data for continuity of a service of the mobile subscriber station.

3. The method of claim 2, wherein the second message is a handover response message (MOB-BSHO-RSP).

4. The method of claim 2, wherein the field of resource retain type has a 2-bit length.

5. The method of claim 2, wherein the second message is a handover request message (MOB-BSHO-REQ).

* * * * *